US007277606B1

(12) United States Patent  (10) Patent No.: US 7,277,606 B1
Sakai et al.  (45) Date of Patent: Oct. 2, 2007

(54) OPTICAL SWITCH DEVICE

(75) Inventors: Yoshio Sakai, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/592,243

(22) Filed: Nov. 3, 2006

(30) Foreign Application Priority Data

Aug. 30, 2006 (JP) .............................. 2006-234058

(51) Int. Cl.
G02B 6/35 (2006.01)
H04B 10/08 (2006.01)

(52) U.S. Cl. .............................. 385/18; 385/17; 398/19

(58) Field of Classification Search ...................... None
See application file for complete search history.

(56) References Cited

U.S. PATENT DOCUMENTS 6,813,410 B2 * 11/2004 Oikawa ........................ 385/18
6,931,173 B1 * 8/2005 Wang et al. ................... 385/18
2004/0047548 A1 3/2004 Okumura et al.
2005/0047711 A1 * 3/2005 Ide et al. ........................ 385/18

FOREIGN PATENT DOCUMENTS

JP 06-123845 5/1994
JP 2004-048187 2/2004

* cited by examiner

Primary Examiner—Rodney Bovernick
Assistant Examiner—Omar Rojas
(74) Attorney, Agent, or Firm—Bingham McCutchen LLP

(57) ABSTRACT

An optical switch device is disclosed that includes an optical system deflecting and outputting input light signals using deflector parts; resistor parts provided in corresponding routes for feeding driving signals output from drivers to the corresponding deflector parts; a signal generator part generating a DC signal and an AC signal and feeding the DC and AC signals to the deflector parts through the corresponding drivers and the corresponding resistors; a threshold generator part generating a first threshold and a second threshold corresponding to the DC and AC signals, respectively; a voltage detector part detecting a voltage across each of the resistor parts; and a failure detector part determining whether the deflector parts are normal or out of order based on the corresponding results of comparing the voltages detected by the voltage detector part with at least one of the first threshold and the second threshold.

10 Claims, 8 Drawing Sheets

OPTICAL SWITCH DEVICE

BACKGROUND OF THE INVENTION

1. Field of the Invention

The present invention relates generally to optical switch devices, and more particularly to an optical switch device that deflects light signals input from multiple input ports using multiple defection parts on a channel-by-channel basis, and outputs the deflected light signals from corresponding output ports.

2. Description of the Related Art

Wavelength division multiplexing (WDM) is an effective technique for constituting a large-capacity optical communications network, and WDM traffic has been exploding these days with the explosive spread of the Internet.

A common optical cross-connect (OXC) system as a backbone optical network according to WDM is formed of multiple optical signal exchangers interconnected by optical fibers. When a WDM light signal is input to the optical signal exchanger through an optical fiber, the optical signal exchanger switches the route of the light signal wavelength by wavelength, and can transmit light signals in the same route in the form of a WDM light signal.

According to such an optical cross-connect system, if an optical fiber forming a communications route fails, it is possible to restore the system at high speed by immediately performing automatic bypassing to a backup optical fiber or the optical fiber of another route. Further, it is also possible to edit optical paths wavelength by wavelength.

In a MEMS (Micro Electro Mechanical Systems) optical switch, concern about reliability is greatest for a MEMS mirror that mechanically operates among the components of the optical switch. It is necessary to detect failure of the MEMS mirror in order to increase the reliability of an optical communications system.

In the conventional MEMS optical switch, light sources are connected to all the input ports of an optical switch through corresponding couplers, and abnormality is detected by monitoring the output levels of all the output ports of the optical switch as described in Patent Document 1.

Further, Patent Document 2 discloses the technique of detecting an abnormality in a scanner from the difference between the oscillation frequency of a movable piece and an applied resonance frequency, the difference in phase between the scanning position of the movable piece and an applied AC (alternating current) voltage, or reduction in the maximum scanning angle of the movable piece.

[Patent Document 1] Japanese Laid-Open Patent Application No. 2004-48187

[Patent Document 2] Japanese Laid-Open Patent Application No. 6-123845

However, according to the conventional MEMS optical switch of Patent Document 1, the light sources of test light are connected to all the input ports and the output levels of all the output ports are monitored, thereby detecting abnormality. Accordingly, the number of test light sources increases so as to cause the problem of an increase in cost and device size. Further, the number of optical components such as light sources and monitors increases, thus causing the problem of reduced reliability of the switch.

SUMMARY OF THE INVENTION

Embodiments of the present invention may solve or reduce one or more of the above-described problems.

According to one embodiment of the present invention, there is provided an optical switch device in which one or more of the above-described problems are eliminated.

According to one embodiment of the present invention, there is provided an optical switch that can significantly reduce the number of optical components by electrically detecting failure so as to be able to reduce the cost and size and accordingly increase the reliability of the optical switch.

According to one embodiment of the present invention, there is provided an optical switch device including an optical system configured to deflect light signals input from a plurality of input ports thereof using a plurality of deflector parts on a channel-by-channel basis, and to output the light signals from a plurality of output ports thereof; a plurality of resistor parts provided in corresponding routes for feeding driving signals output from a plurality of drivers to the corresponding deflector parts; a signal generator part configured to generate a DC signal and an AC signal and feed the DC signal and the AC signal to the deflector parts through the corresponding drivers and the corresponding resistors; a threshold generator part configured to generate a first threshold and a second threshold corresponding to the DC signal and the AC signal, respectively, generated by the signal generator part; a voltage detector part configured to detect a voltage across each of the resistor parts; and a failure detector part configured to determine whether the deflector parts are normal or out of order based on corresponding results of comparing the voltages detected by the voltage detector part with at least one of the first threshold and the second threshold generated by the threshold voltage generator part.

According to the above-described optical switch device, it is possible to significantly reduce the number of optical components by electrically performing failure detection, so that it is possible to reduce the cost and size of the device, and accordingly, to increase reliability.

According to one embodiment of the present invention, there is provided an optical switch device including an optical system configured to deflect light signals input from a plurality of input ports thereof using a plurality of deflector parts on a channel-by-channel basis, and to output the light signals from a plurality of output ports thereof; a plurality of resistor parts provided in corresponding channels for feeding driving signals output from a plurality of drivers to the corresponding deflector parts; a signal generator part configured to generate an AC signal having a varying frequency, and to feed the AC signal to the deflector parts through the corresponding drivers and the corresponding resistors; a threshold generator part configured to generate thresholds corresponding to the AC signal having the varying frequency generated by the signal generator part; a voltage detector part configured to detect a voltage across each of the resistor parts; and a failure detector part configured to determine whether the deflector parts are normal or out of order based on corresponding results of comparing the voltages across the resistor parts detected by the voltage detector part with the thresholds generated in the threshold voltage generator part.

According to the above-described optical switch device, it is possible to significantly reduce the number of optical components by electrically performing failure detection, so that it is possible to reduce the cost and size of the device, and accordingly, to increase reliability.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention.

[Principle of Present Invention]

A MEMS mirror is rotated by applying voltage between a fixed electrode and a movable electrode. The movable electrode is provided on the MEMS mirror. The failure mode of the MEMS mirror can be the open circuit of the internal interconnection of the MEMS mirror package (the interconnection of the MEMS mirror to the fixed electrode) or a short circuit caused by the contact of the fixed electrode and the movable electrode of the MEMS mirror. Accordingly, the failure of the MEMS mirror can be detected if the three conditions of the MEMS mirror, that is, the normal condition, open-circuit condition, and short-circuit condition, can be detected.

Figure 1A:
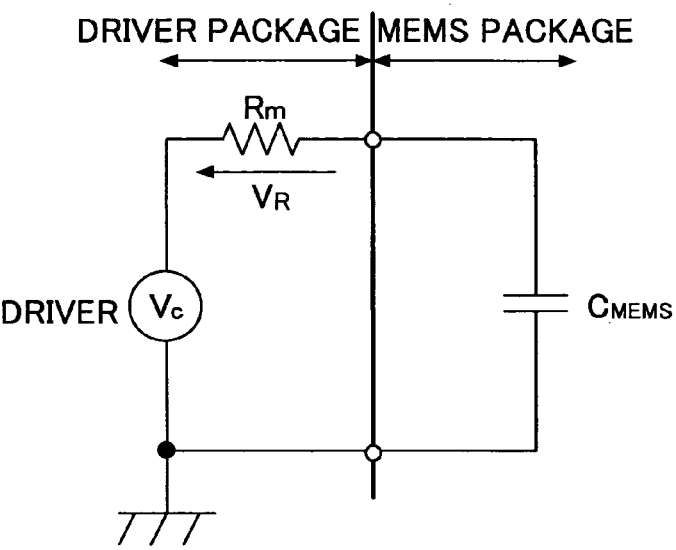
FIGS. 1A through 1C are an equivalent circuit diagram, a signal waveform chart, and another signal waveform chart, respectively, for illustrating a normal condition according to the principle of the present invention.

As shown in FIG. 1A, failure diagnosis is performed by connecting a resistor Rm in series to the capacitance $C_{MEMS}$ between the fixed electrode and the movable electrode of the MEMS mirror and monitoring a potential difference across the resistor Rm in the case of applying each of a DC (direct current) signal and an AC signal from a driver.

Figure 1B:
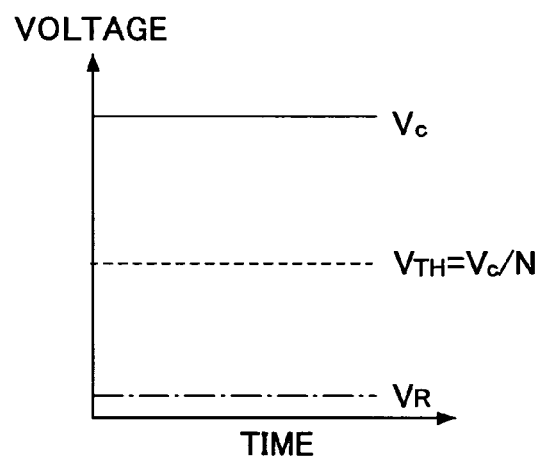

In the normal condition, the resistor Rm for monitoring and the inter-electrode capacitance $C_{MEMS}$ of the MEMS mirror are observed from the driver side as shown in the equivalent circuit of FIG. 1A. With respect to the DC signal (voltage Vc), the impedance of the inter-electrode capacitance $C_{MEMS}$ is high, so that as shown in FIG. 1B, the potential difference $V_R$ between both ends of the resistor Rm indicated by a one-dot chain line is less than a threshold voltage $V_{TH}$ indicated by a broken line. The threshold voltage $V_{TH}$ is obtained by dividing the voltage $V_C$ by N that is a value greater than or equal to one.

Figure 1C:
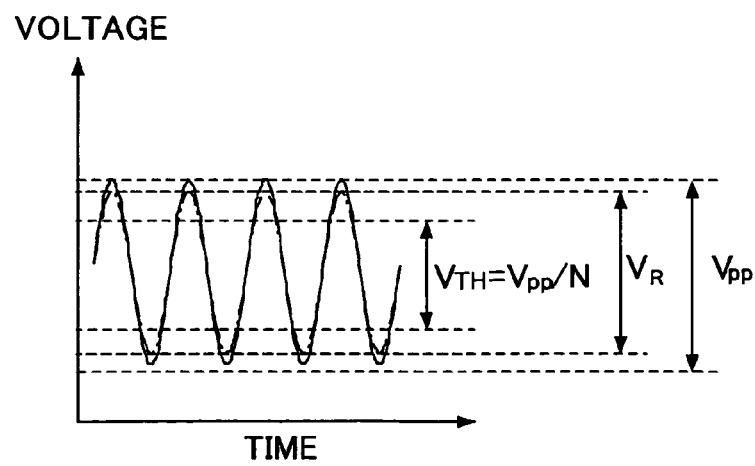

With respect to the AC signal, the impedance of the inter-electrode capacitance $C_{MEMS}$ is low, so that as shown in FIG. 1C, the peak-to-peak voltage $V_R$ of the resistor Rm indicated by a one-dot chain line is greater than a threshold voltage $V_{TH}$. The threshold voltage $V_{TH}$ is obtained by dividing the peak-to-peak voltage Vpp of the AC signal by N that is a value greater than or equal to one.

Figure 2A:
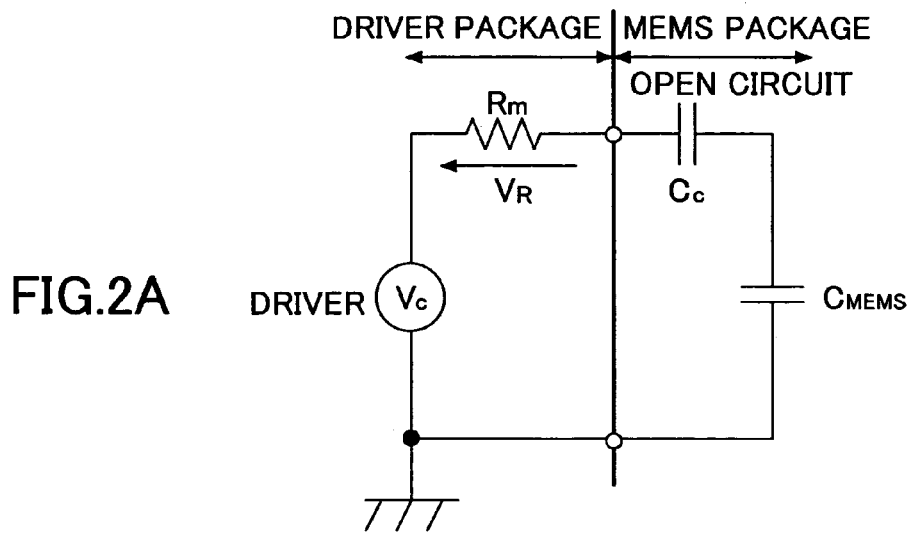
FIGS. 2A through 2C are an equivalent circuit diagram, a signal waveform chart, and another signal waveform chart, respectively, for illustrating an open-circuit condition according to the principle of the present invention.

If an open circuit occurs in the MEMS mirror package, the open-circuit part is seen as a capacitance so that the resistor Rm for monitoring, an open-circuit capacitance Cc, and the inter-electrode capacitance $C_{MEMS}$ of the MEMS mirror are observed from the driver side as shown in the equivalent circuit of FIG. 2A. Since the interconnection is thin, the open-circuit capacitance $Cc < C_{MEMS}$ holds.

Figure 2B:
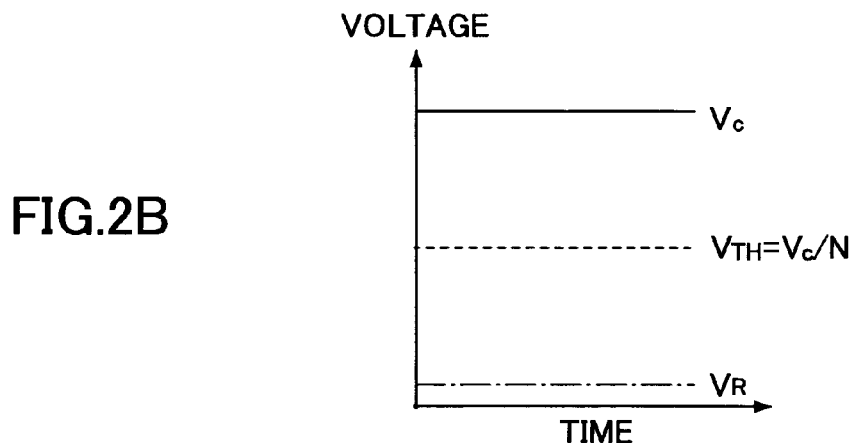

With respect to the DC signal, the impedance of the combined capacitance of $C_{MEMS}$ and Cc is high, so that as shown in FIG. 2B, the potential difference $V_R$ between both ends of the resistor Rm indicated by a one-dot chain line is less than the threshold voltage $V_{TH}$ indicated by a broken line. The threshold voltage $V_{TH}$ is obtained by dividing the voltage $V_C$ by N that is a value greater than or equal to one.

Figure 2C:
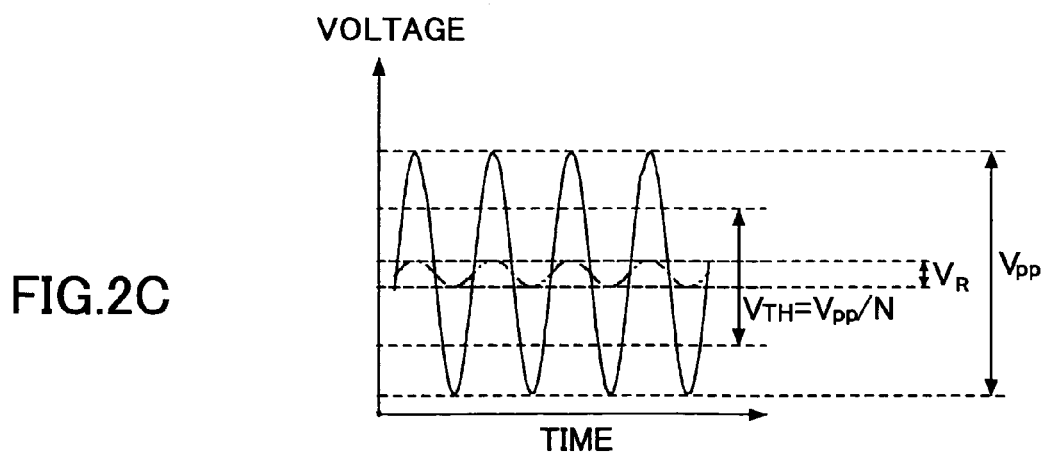

With respect to the AC signal, the impedance of the combined capacitance is greater than the impedance in the normal condition, so that as shown in FIG. 2C, the peak-to-peak voltage $V_R$ of the resistor Rm indicated by a one-dot chain line is less than the threshold voltage $V_{TH}$. The threshold voltage $V_{TH}$ is obtained by dividing the peak-to-peak voltage Vpp of the AC signal by N that is a value greater than or equal to one.

Figure 3A:
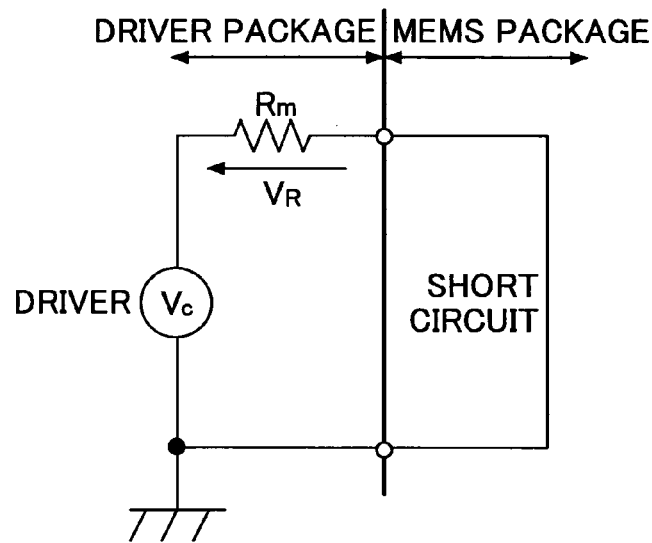
FIGS. 3A through 3C are an equivalent circuit diagram, a signal waveform chart, and another signal waveform chart, respectively, for illustrating a short-circuit condition according to the principle of the present invention.
Figure 3B:
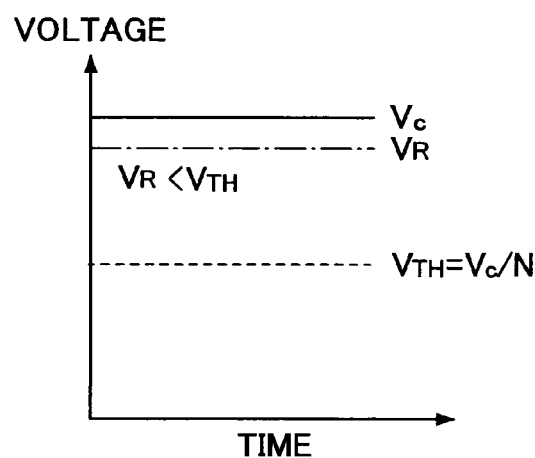

If the fixed electrode and the movable electrode of the MEMS mirror are short-circuited, only the resistor Rm for monitoring is seen from the driver side as shown in the equivalent circuit of FIG. 3A. Therefore, with respect to the DC signal, as shown in FIG. 3B, the potential difference $V_R$ between both ends of the resistor Rm indicated by a one-dot chain line is greater than the threshold voltage $V_{TH}$ indicated by a broken line. The threshold voltage $V_{TH}$ is obtained by dividing the voltage $V_C$ by N that is a value greater than or equal to one.

Figure 3C:
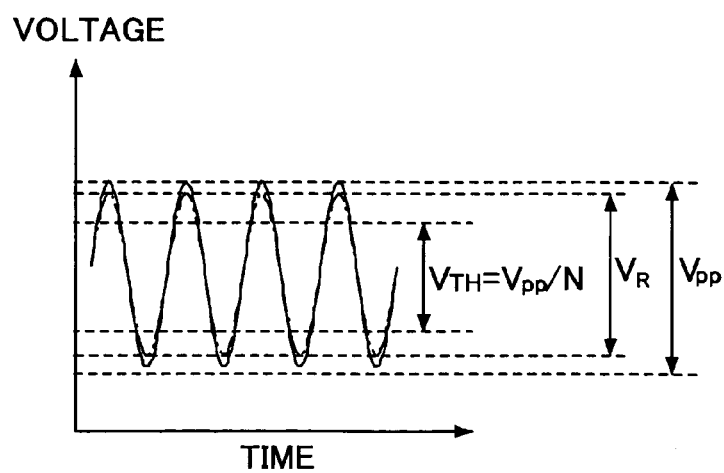

With respect to the AC signal, as shown in FIG. 3C, the peak-to-peak voltage $V_R$ of the resistor Rm indicated by a one-dot chain line is also greater than the threshold voltage $V_{TH}$. The threshold voltage $V_{TH}$ is obtained by dividing the peak-to-peak voltage Vpp of the AC signal by N that is a value greater than or equal to one.

Thus, the normal condition, open-circuit condition, and short-circuit condition of the MEMS mirror can be identified by monitoring the potential difference between both ends of the resistor Rm for each of a DC signal and an AC signal.

[Configuration of MEMS Optical Switch Device]

According to a MEMS optical switch device of this embodiment, a light signal input from one of multiple input ports is subjected to switching on a channel-by-channel basis so as to be output selectively from an output port assigned to the one of the input ports. Here, a light signal input to one input port is referred to as one channel irrespective of whether the input light signal is a single-wavelength or WDM signal.

Figure 4:
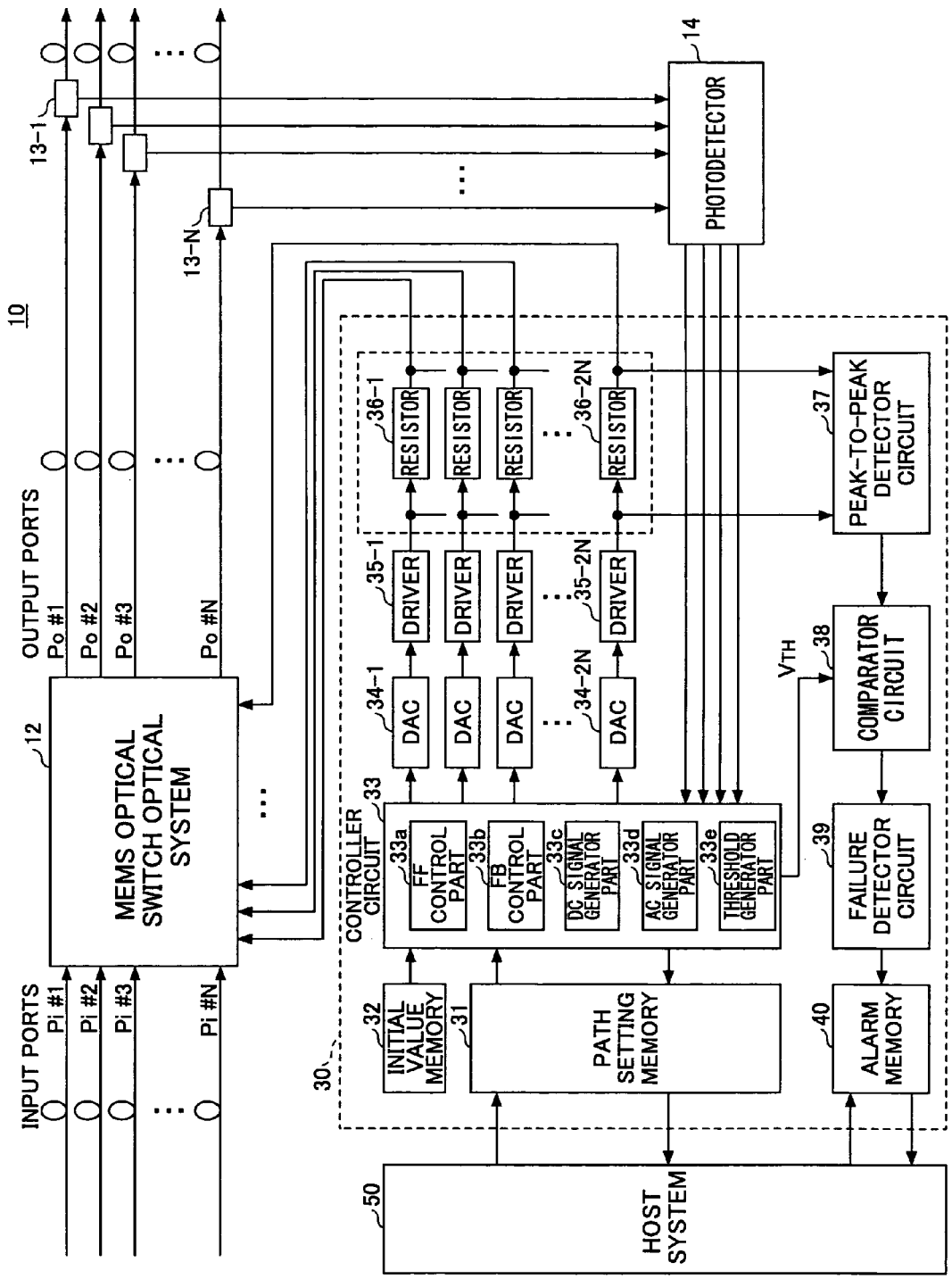
FIG. 4 is a block diagram showing a MEMS optical switch device according to an embodiment of the present invention.

FIG. 4 is a block diagram showing a MEMS optical switch device 10 according to the embodiment of the present invention.

Referring to FIG. 4, the MEMS optical switch device 10 has light signals of N channels input thereto from input ports Pi#1 through Pi#N, respectively, and the input light signals are fed to a MEMS optical switch optical system 12. The light signals output from the optical fibers of output ports Po#1 through Po#N, respectively, of the MEMS optical switch optical system 12 are output through corresponding optical couplers 13-1 through 13-N. Each of the optical couplers 13-1 through 13-N splits the corresponding output light of the MEMS optical switch optical system 12 so as to output one portion (a large part) of the output light as an output light signal and feed the other portion (remaining part) of the output light to a photodetector 14 as a light signal for feedback control of the level of the output light signal.

The photodetector 14 monitors the light signals separated in the optical couplers 13-1 through 13-N, and includes, for example, a photodiode that outputs an electrical signal (a photocurrent or a current signal) according to the level of each light signal; and a current-voltage converter that converts the photocurrent into a voltage signal and outputs the voltage signal. The photodetector 14 feeds a detected light level of each channel to an optical switch subsystem control part 30.

Figure 5:
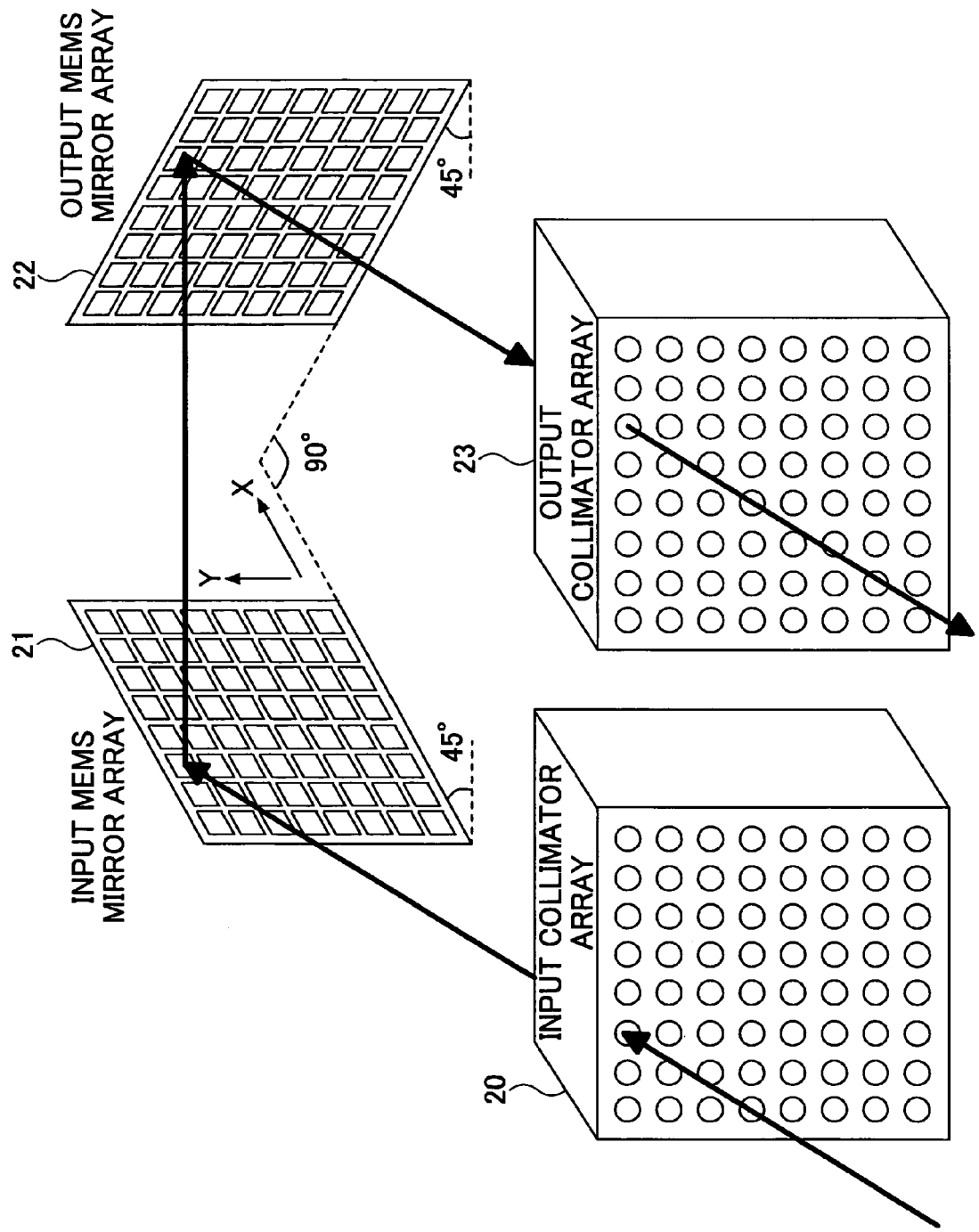
FIG. 5 is a structure diagram of a MEMS optical switch optical system according to the embodiment of the present invention.

As shown in the structure diagram of FIG. 5, the MEMS optical switch optical system 12 includes an array of two-dimensionally arranged input collimators for N channels (an input collimator array) 20, an array of two-dimensionally arranged input MEMS mirrors for N channels (an input MEMS mirror array) 21, an array of two-dimensionally arranged output MEMS mirrors for N channels (an output MEMS mirror array) 22, and an array of two-dimensionally arranged output collimators for N channels (an output collimator array) 23.

The light signals of the respective channels input from the optical fibers of the input ports Pi#1 through Pi#N are arrayed and converted into collimated light in the input collimator array 20 so as to be input to the input MEMS mirror array 21. Each of the input MEMS mirror array 21 and the output MEMS mirror arrays 22 is an array of N tilt mirrors disposed on a plane. Each tilt mirror has rotation axes parallel to the X-axis and Y-axis. Each tilt mirror is driven under the control of the optical switch subsystem control part 30 described below so as to have the angle of each of the two axes adjusted to reflect signal light.

The signal light reflected from each MEMS mirror of the input MEMS mirror array 21, which is disposed at 45° to the surface of the input collimator array 20, is reflected by a selected or corresponding one of the MEMS mirrors of the output MEMS mirror array 22, which is disposed at 90° to the surface of the input MEMS mirror array 21, and enters the output collimator array 23, which is disposed at 45° to the surface of the output MEMS mirror array 22, so as to be output to a selected or corresponding one of the optical fibers of the arrayed output ports Po#1 through Po#N.

The angle adjustment of the MEMS mirrors of the input MEMS mirror array 21 determines on which MEMS mirror of the output MEMS mirror array 22 entering light is made incident. The angle adjustment of the MEMS mirrors of the output MEMS mirror array 22 determines to which one of the optical fibers of the output ports Po#1 through Po#N the entering light is output.

Referring back to FIG. 4, the optical switch subsystem control part 30 includes a path setting memory 31, an initial value memory 32, a controller circuit 33, DACs (Digital-to-Analog Converters) 34-1 through 34-2N for 2N channels, drivers 35-1 through 35-2N for 2N channels, resistors 36-1 through 36-2N for 2N channels, a peak-to-peak detector circuit 37, a comparator circuit 38, a failure detector circuit 39, and a memory for alarms (alarm memory) 40.

The path setting memory 31 is provided for a host system 50 to request the optical switch subsystem control part 30 to set a path. The initial value memory 32 is for retaining a deflection control amount for performing path setting requested by the host system 50. Further, the alarm memory 40 is for storing the condition of the optical switch 10 and notifying the host system 50 of the condition. When an abnormality occurs in a MEMS mirror, alarm information is retained in the alarm memory 40.

The controller circuit 33 includes an FF control part 33a and an FB control part 33b. The FF control part 33a reads out the deflection control amount of a corresponding MEMS mirror prestored in the initial value memory 32 and establishes a path connection by feedforward control in response to a request from the host system 50. The FB control part 33b performs feedback control, based on the light level of the output light signal of each channel detected and fed by the photodetector 14, on the drivers 35-1 through 35-2N so as to determine the deflections of the corresponding MEMS mirrors.

In order to determine failure of the MEMS mirrors, the controller circuit 33 further includes a DC signal generator part 33c that generates a DC signal, an AC signal generator part 33d that generates an AC signal, and a threshold value generator part 33e that generates threshold values according to the DC signal and the AC signal. The controller circuit 33 may be configured of, for example, an ASIC (Application Specific Integrated Circuit) such as an FPGA (Field Programmable Gate Array).

The DACs 34-1 through 34-2N convert respective digital control amounts fed from the controller circuit 33 into analog control amounts, and feed the analog control amounts to the drivers 35-1 through 35-2N, respectively. The drivers 35-1 through 35-2N feed the respective analog control amounts to the corresponding N MEMS mirrors of the input MEMS mirror array 21 and N MEMS mirrors of the output MEMS mirror array 22, thereby variably controlling the angles of the 2N MEMS mirrors. That is, the deflections of the input light signals of the MEMS optical switch optical system 12 are varied by the drivers 35-1 through 35-2N.

The resistors 36-1 through 36-2N interposed between the drivers 35-1 through 35-2N and the corresponding MEMS mirrors correspond to the resistor Rm for checking a MEMS mirror operation shown in FIGS. 1A, 2A, and 3A. The DC signal generated by the DC signal generator part 33c and the AC signal generated by the AC signal generator part 33d are fed from the DACs 34-1 through 34-2N to the corresponding resistors 36-1 through 36-2N, and the potential differences across the resistors 36-1 through 36-2N are detected by the peak-to-peak detector circuit 37 by time division.

The comparator circuit 38 compares each detected peak-to-peak value (amplitude difference) with a threshold generated by the threshold generator part 33e, and feeds the comparison results to the failure detector circuit 39. The failure detector circuit 39 detects failure of the MEMS mirrors based on the fed comparison results. A MEMS mirror of which failure is detected is set in the alarm memory 40, and is reported to the host system 50.

[Failure Detection Method]

Figure 6:
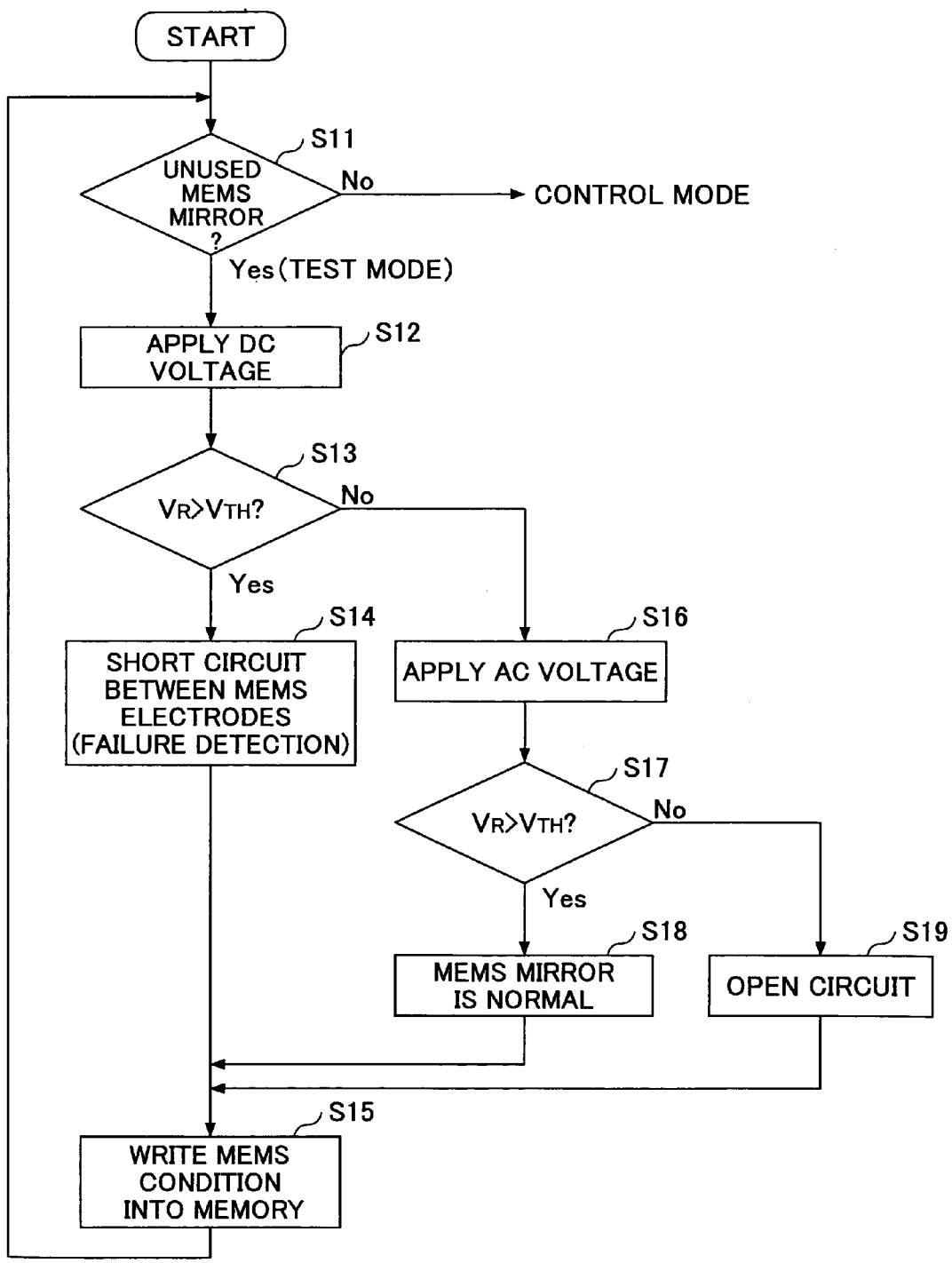
FIG. 6 is a flowchart of a MEMS mirror failure detecting operation according to the embodiment of the present invention.

FIG. 6 is a flowchart of a MEMS mirror failure detecting operation performed by the controller circuit 33, the comparator circuit 38, and the failure detector circuit 39. In step S11 of FIG. 6, one MEMS mirror after another is selected from the MEMS mirrors of the input MEMS mirror array 21 and the output MEMS mirror array 22, and path setting information corresponding to the selected one of the MEMS mirrors is read out from the path setting memory 31. Then, it is determined based on the read-out path setting information whether the selected MEMS mirror is unused.

If the selected MEMS mirror is unused (YES in step S11), the operation enters a test mode, and in step S12, a DC voltage generated in the DC signal generator part 33c is applied to the MEMS mirror through a corresponding one of the drivers 35-1 through 35-2N and a corresponding one of the resistors 36-1 through 36-2N.

Next, in step S13, a potential difference $V_R$ across the corresponding one of the resistors 36-1 through 36-2N is compared with a threshold voltage $V_{TH}$ generated in the threshold generator part 33e, and it is determined whether $V_R > V_{TH}$. If the potential difference $V_R$ is greater than the threshold voltage $V_{TH}$(YES in step S13), in step S14, the comparator circuit 38 and the failure detector circuit 39 detects a short circuit between the electrodes of the MEMS mirror. Then, in step S15, the failure detector circuit 39 writes alarm information into an area for the MEMS mirror in the alarm memory 40.

On the other hand, if the potential difference $V_R$ is less than or equal to the threshold voltage $V_{TH}$(NO in step S13), in step S16, an AC voltage generated in the AC signal generator part 33d is applied to the MEMS mirror via the corresponding one of the drivers 35-1 through 35-2N and the corresponding one of the resistors 36-1 through 36-2N.

Next, in step S17, a peak-to-peak voltage (voltage difference) $V_R$ of the corresponding one of the resistors 36-1 through 36-2N is compared with a threshold voltage $V_{TH}$ generated in the threshold generator part 33e, and it is determined whether $V_R > V_{TH}$. If the peak-to-peak voltage $V_R$ is greater than the threshold voltage $V_{TH}$(YES in step S17), in step S18, the comparator circuit 38 and the failure detector circuit 39 determines that the MEMS mirror is normal, and in step S15, the failure detector circuit 39 writes normality information (indicating that the MEMS mirror is normal) into an area for the MEMS mirror in the alarm memory 40.

On the other hand, if the peak-to-peak voltage $V_R$ is less than or equal to the threshold voltage $V_{TH}$(YES in step S17), in step S19, the comparator circuit 38 and the failure detector circuit 39 detects an open circuit such as an interconnection disconnection in the MEMS mirror package. Then, in step S15, the failure detector circuit 39 writes alarm information into an area for the MEMS mirror in the alarm memory 40.

After writing alarm information or normality information in the alarm memory 40 in step S15, the operation returns to step S11, and the next MEMS mirror is selected. Then, the operation of steps S11 through S19 is repeated.

According to the above-described procedure of the flowchart of FIG. 6, failure detection is performed by applying a DC signal and an AC signal separately. Alternatively, it is also possible to perform failure detection by superposing an AC signal on a DC signal.

Further, if a light signal from one of the optical couplers 13-1 through 13-N connected to the output port of a path with respect to which the host system 50 has made a path connection request to the path setting memory 31 is not detected in the photodetector 14, the failure detection of steps S12 through S19 may be performed on a corresponding MEMS mirror although the MEMS mirror is in use. If it is determined in step S18 that the MEMS mirror is normal, the failure detector circuit 39 may determine that there is a light signal input interruption, and write input interruption alarm information into the alarm memory 40 to notify the host system of the input interruption.

Figure 7:
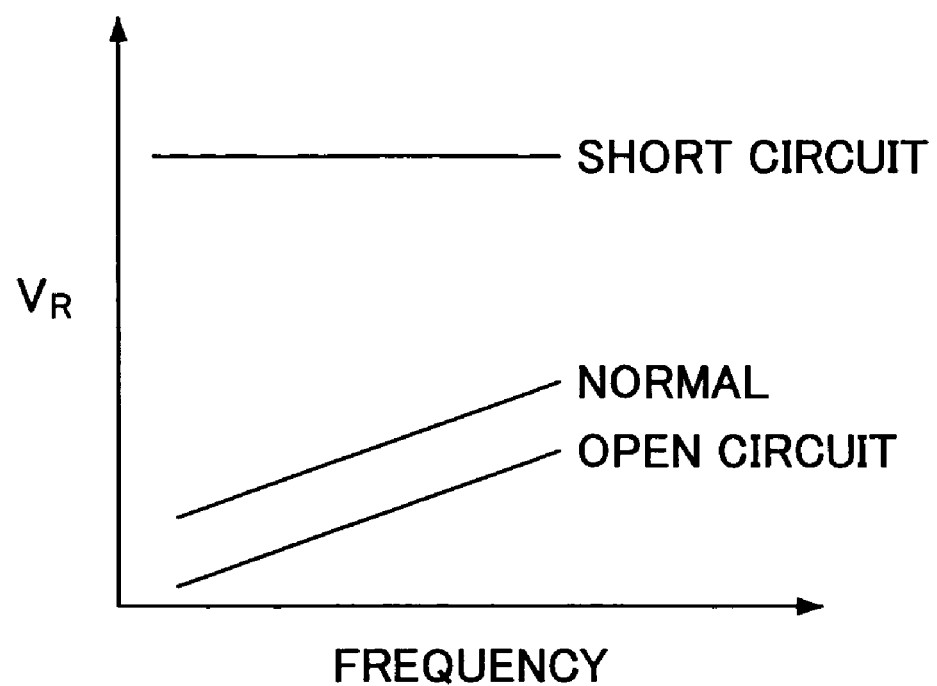
FIG. 7 is a graph showing peak-to-peak voltages of the normal condition, the open-circuit condition, and the short-circuit condition with respect to a change in the frequency of an AC signal according to the embodiment of the present invention.

Further, in the case of varying the frequency of the AC signal, as shown in FIG. 7, the peak-to-peak voltage $V_R$ of the resistor Rm changes in the normal condition and the open-circuit condition, and the peak-to-peak voltage $V_R$ is greater in the normal condition than in the open-circuit condition. On the other hand, the peak-to-peak voltage $V_R$ of the resistor Rm is constant in the short-circuit condition. That is, in the normal condition, as the frequency becomes higher, the impedance of the capacitance $C_{MEMS}$ between the electrodes of a MEMS mirror decreases so that the peak-to-peak voltage $V_R$ increases. In the open-circuit condition, capacitive load increases so that the peak-to-peak voltage $V_R$ is reduced compared with the normal time. In the short-circuit condition, the impedance remains unchanged irrespective of an increase in the frequency, so that the peak-to-peak voltage $V_R$ is constant.

Using this, failure detection of a MEMS mirror may be performed by performing a frequency sweep on the AC signal in the AC signal generator part 33d and detecting variations in the peak-to-peak voltage $V_R$ of the resistor Rm in the peak-to-peak detector circuit 37. In this case, the threshold generator part 33e generate a first value intermediate between the normal condition and the short-circuit condition and a second value intermediate between the normal condition and the open-circuit condition in FIG. 7 as threshold values $V_{TH}$.

The frequency of the AC signal may be digitally varied, or varied with a VCO (Voltage-Controlled Oscillator) that controls frequency with voltage.

Figure 8A:
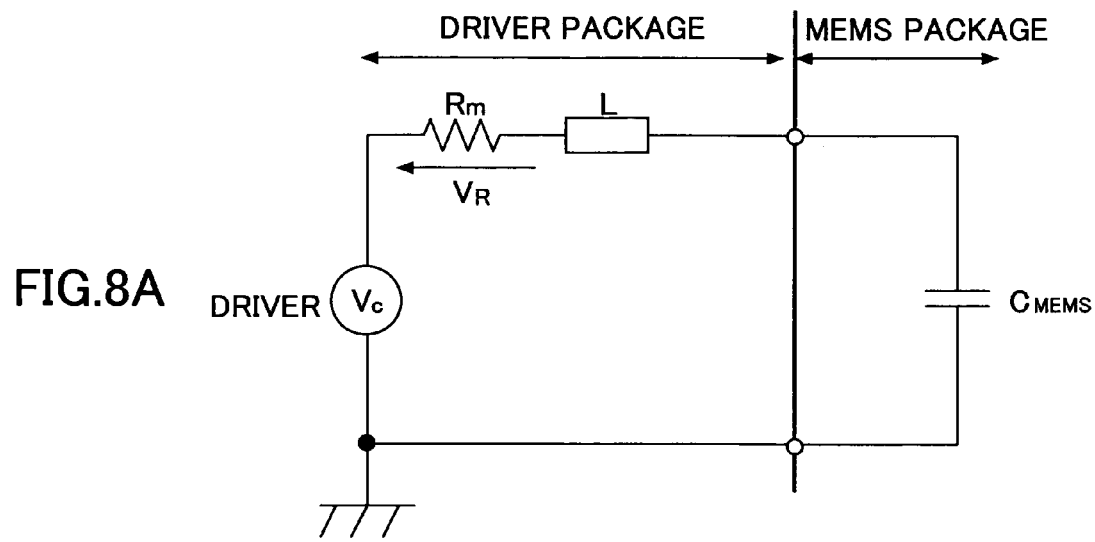
FIGS. 8A and 8B are a circuit diagram and a signal waveform chart, respectively, of a resonant circuit according to the embodiment of the present invention.
Figure 8B:
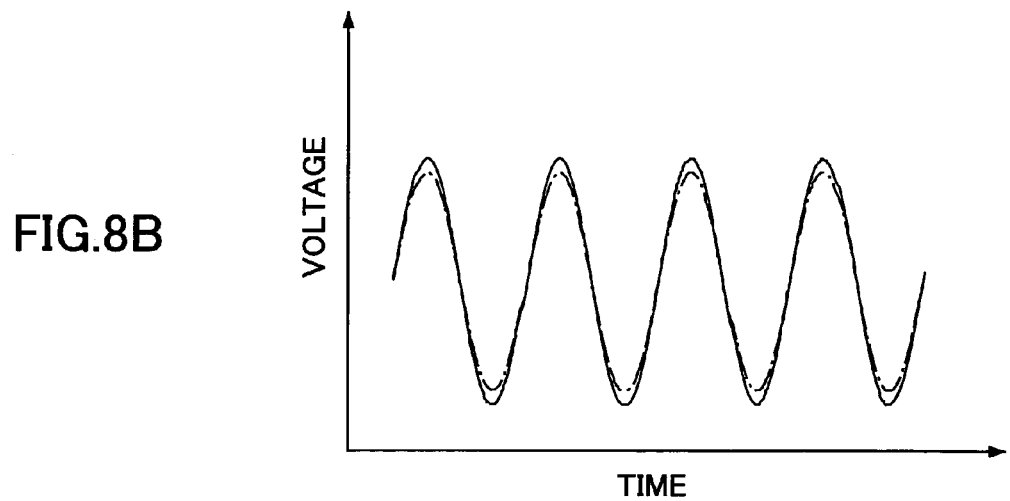

As a circuit in the case of performing a frequency sweep, a series resonant circuit of the capacitance $C_{MEMS}$ between the electrodes of a MEMS mirror and a inductor L may be employed as shown in FIG. 8A. In this case, the capacitance $C_{MEMS}$ between the electrodes of the MEMS mirror changes (and the MEMR mirror is caused to move simultaneously) depending on the DC voltage Vc applied from the driver to the MEMS mirror. Accordingly, the resonance frequency of the resonant circuit changes in accordance with a change in the DC voltage applied to the MEMS mirror. If the MEMS mirror is normal, the potential difference $V_R$ of the resistor Rm changes as indicated by a one-dot chain line in response to a change in the DC voltage Vc indicated by a solid line as shown in FIG. 8B.

Accordingly, the capacitance $C_{MEMS}$ between the electrodes of the MEMS mirror, that is, the deflection angle of the MEMS mirror, is determined by measuring the resonance frequency by performing a frequency sweep by changing the DC voltage. Therefore, it is possible to perform failure detection on the principle described with reference to FIG. 7.

Further, the voltage detection of the AC signal may employ a detection method other than the peak-to-peak voltage detection, such as effective value detection, and the threshold used for failure detection may be determined by a method optimal for such a detection method. Further, the voltage detection may be performed at a part other than the resistor. For example, an inductor may be connected in series to the resistor so as to facilitate monitoring of a change in voltage.

Thus, it is possible to detect failure of a MEMS mirror without using a test light source, so that it is possible to construct a highly reliable optical communications system at low cost with a small-size optical switch.

According to one embodiment of the present invention, there is provided an optical switch device including an optical system configured to deflect light signals input from a plurality of input ports thereof using a plurality of deflector parts on a channel-by-channel basis, and to output the light signals from a plurality of output ports thereof; a plurality of resistor parts provided in corresponding routes for feeding driving signals output from a plurality of drivers to the corresponding deflector parts; a signal generator part configured to generate a DC signal and an AC signal and feed the DC signal and the AC signal to the deflector parts through the corresponding drivers and the corresponding resistors; a threshold generator part configured to generate a first threshold and a second threshold corresponding to the DC signal and the AC signal, respectively, generated by the signal generator part; a voltage detector part configured to detect a voltage across each of the resistor parts; and a failure detector part configured to determine whether the deflector parts are normal or out of order based on corresponding results of comparing the voltages detected by the voltage detector part with at least one of the first threshold and the second threshold generated by the threshold voltage generator part.

According to the above-described optical switch device, it is possible to significantly reduce the number of optical components by electrically performing failure detection, so that it is possible to reduce the cost and size of the device, and accordingly, to increase reliability.

According to one embodiment of the present invention, there is provided an optical switch device including an optical system configured to deflect light signals input from a plurality of input ports thereof using a plurality of deflector parts on a channel-by-channel basis, and to output the light signals from a plurality of output ports thereof; a plurality of resistor parts provided in corresponding channels for feeding driving signals output from a plurality of drivers to the corresponding deflector parts; a signal generator part configured to generate an AC signal having a varying frequency, and to feed the AC signal to the deflector parts through the corresponding drivers and the corresponding resistors; a threshold generator part configured to generate thresholds corresponding to the AC signal having the varying frequency generated by the signal generator part; a voltage detector part configured to detect a voltage across each of the resistor parts; and a failure detector part configured to determine whether the deflector parts are normal or out of order based on corresponding results of comparing the voltages across the resistor parts detected by the voltage detector part with the thresholds generated in the threshold voltage generator part.

According to the above-described optical switch device, it is possible to significantly reduce the number of optical components by electrically performing failure detection, so that it is possible to reduce the cost and size of the device, and accordingly, to increase reliability.

In the above-described configurations, the input MEMS mirror array 21 and the output MEMS mirror array 22 may correspond to the deflector parts, the resistors 36-1 through 36-2N may correspond to resistor parts, the DC signal generator part 33*c* and the AC signal generator part 33*d* may correspond to the signal generator part, the threshold generator part 33*e* may correspond to the threshold voltage generator part, the peak-to-peak detector circuit 37 may correspond to the voltage detector part, and the comparator circuit 38 and the failure detector circuit 39 may correspond to the failure detector part. Further, in other configurations, the controller circuit 33 may correspond to a selector part, the optical couplers 13-1 through 13-N may correspond to separator parts, the photodetector 14 may correspond to a photodetector part, the failure detector circuit 39 may correspond to a light signal input interruption detector part, the input MEMS mirror array 21 may correspond to an input deflector part, and the output MEMS mirror array 22 may correspond to an output deflector part.

The present invention is not limited to the specifically disclosed embodiment, and variations and modifications may be made without departing from the scope of the present invention.

The present application is based on Japanese Priority Patent Application No. 2006-234058, filed on Aug. 30, 2006, the entire contents of which are hereby incorporated by reference.

What is claimed is:

1. An optical switch device, comprising:
   an optical system configured to deflect light signals input from a plurality of input ports thereof using a plurality of deflector parts on a channel-by-channel basis, and to output the light signals from a plurality of output ports thereof;
   a plurality of resistor parts provided in corresponding routes for feeding driving signals output from a plurality of drivers to the corresponding deflector parts;
   a signal generator part configured to generate a DC signal and an AC signal and feed the DC signal and the AC signal to the deflector parts through the corresponding drivers and the corresponding resistors;
   a threshold generator part configured to generate a first threshold and a second threshold corresponding to the DC signal and the AC signal, respectively, generated by the signal generator part;
   a voltage detector part configured to detect a voltage across each of the resistor parts; and
   a failure detector part configured to determine whether the deflector parts are normal or out of order based on corresponding results of comparing the voltages detected by the voltage detector part with at least one of the first threshold and the second threshold generated by the threshold voltage generator part.

2. The optical switch device as claimed in claim 1, wherein:
   each of the deflector parts comprises a MEMS mirror; and
   a failure of each of the deflector parts is at least one of a short circuit of a fixed electrode and a movable electrode of the MEMS mirror and an open circuit in an interconnection of the MEMS mirror to the movable electrode.

3. The optical switch device as claimed in claim 1, further comprising:
   a selector part configured to select an unused one of the deflector parts, to cause the DC signal and the AC signal generated by the signal generator part to be fed to one of the drivers corresponding to the selected unused one of the deflector parts, and to cause the failure detector part to determine whether the selected unused one of the deflector parts is normal or out of order.

4. The optical switch device as claimed in claim 1, further comprising:
   a plurality of separator parts each configured to separate a portion of the light signal output from a corresponding one of the output ports;
   a photodetector part configured to detect the portion of the light signal separated in each of the separator parts; and
   a light signal input interruption detector part configured to, if the portion of the light signal separated in one of the separator parts corresponding to one of the output ports for a path with respect to which a path connection request is made is not detected in the photodetector, select one of the deflector parts in use corresponding to the path, cause the DC signal and the AC signal generated by the signal generator part to be fed to one of the drivers corresponding to the selected one of the deflector parts, and detect a light signal input interruption of a corresponding channel if the failure detector part determines that the selected one of the deflector parts is normal.

5. The optical switch device as claimed in claim 1, wherein the deflector parts comprise an input deflector part and an output deflector part for each of the channels.

6. An optical switch device, comprising:
  an optical system configured to deflect light signals input from a plurality of input ports thereof using a plurality of deflector parts on a channel-by-channel basis, and to output the light signals from a plurality of output ports thereof;
  a plurality of resistor parts provided in corresponding channels for feeding driving signals output from a plurality of drivers to the corresponding deflector parts;
  a signal generator part configured to generate an AC signal having a varying frequency, and to feed the AC signal to the deflector parts through the corresponding drivers and the corresponding resistors;
  a threshold generator part configured to generate thresholds corresponding to the AC signal having the varying frequency generated by the signal generator part;
  a voltage detector part configured to detect a voltage across each of the resistor parts; and
  a failure detector part configured to determine whether the deflector parts are normal or out of order based on corresponding results of comparing the voltages across the resistor parts detected by the voltage detector part with the thresholds generated in the threshold voltage generator part.

7. The optical switch device as claimed in claim 6, wherein the signal generator part digitally varies the frequency of the AC signal.

8. The optical switch device as claimed in claim 6, wherein the signal generator part varies the frequency of the AC signal with a voltage-controlled oscillator.

9. The optical switch device as claimed in claim 6, wherein:
  each of the deflector parts comprises a MEMS mirror;
  each of the deflector parts comprises an inductor forming a series resonant circuit with a capacitance between a fixed electrode and a movable electrode of the MEMS mirror; and
  the frequency of the AC signal generated by the signal generator part is varied by varying the driving signals fed to the deflector parts.

10. The optical switch device as claimed in claim 6, wherein the deflector parts comprise an input deflector part and an output deflector part for each of the channels.

* * * * *